(12) United States Patent
Ferreira

(10) Patent No.: US 11,394,701 B2
(45) Date of Patent: Jul. 19, 2022

(54) NON-COMPLIANCE EVENT NOTIFICATIONS TO COMPANION DEVICES

(71) Applicant: HEWLETT-PACKARD DEVELOPMENT COMPANY, L.P., Spring, TX (US)

(72) Inventor: Ronaldo Rod Ferreira, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 116 days.

(21) Appl. No.: 16/481,819

(22) PCT Filed: Nov. 1, 2017

(86) PCT No.: PCT/US2017/059452
§ 371 (c)(1),
(2) Date: Jul. 29, 2019

(87) PCT Pub. No.: WO2019/089020
PCT Pub. Date: May 9, 2019

(65) Prior Publication Data
US 2020/0259812 A1    Aug. 13, 2020

(51) Int. Cl.
*H04L 29/06* (2006.01)
*H04L 9/40* (2022.01)
*H04L 9/30* (2006.01)

(52) U.S. Cl.
CPC ............ *H04L 63/08* (2013.01); *H04L 9/30* (2013.01); *H04L 63/0428* (2013.01)

(58) Field of Classification Search
CPC . H04L 63/08; H04L 63/0428; H04L 63/1416; H04L 9/30; G06F 21/44; G06F 21/52
See application file for complete search history.

(56) References Cited

U.S. PATENT DOCUMENTS 7,558,966 B2    7/2009  Durham et al.
8,510,825 B2    8/2013  Tarkhanyan et al.
(Continued)

FOREIGN PATENT DOCUMENTS

EP    1864238        12/2007
EP    2918094 A1     9/2015

OTHER PUBLICATIONS

Codish, D. et al., Best Practices: Deploying the Intel Unite® Solution, Jun. 3, 2017, https://www.intel.com/content/dam/www/public/us/en/documents/best-practices/best-practices-deploying-the-intel-unite-solution-paper.pdf.

*Primary Examiner* — Chau Le
(74) *Attorney, Agent, or Firm* — Lakshmi Kumaran & Sridharan

(57) ABSTRACT

An example computing device includes a processor to establish a secure connection with a companion device via a companion service application executable by the processor. The processor is also to receive a local credential and a remote credential from the companion device via the companion service application. The processor is further to monitor an aspect of the computing device via an agent application executable by the processor. In response to detecting a non-compliance event via the agent application, the processor is to transmit a notification to the companion device via the agent application using the local credential, the remote credential, or a combination thereof.

15 Claims, 6 Drawing Sheets

(56) References Cited

U.S. PATENT DOCUMENTS

| | | |
|---|---|---|
| 8,745,746 B1 | 6/2014 | Jain |
| 9,183,384 B1 | 11/2015 | Bruhmuller |
| 9,424,430 B2 | 8/2016 | Rosenan |
| 9,721,112 B2 | 8/2017 | Tse et al. |
| 11,037,150 B2 * | 6/2021 | Van Os ................ G06Q 20/401 |
| 2009/0254969 A1 | 10/2009 | Parker et al. |
| 2012/0255012 A1 | 10/2012 | Sallam |
| 2013/0090169 A1 * | 4/2013 | Liu ..................... H04L 12/2829 |
| | | 463/42 |
| 2014/0080453 A1 | 3/2014 | Brewer et al. |
| 2014/0337628 A1 * | 11/2014 | Amato .................. H04L 9/0825 |
| | | 713/171 |
| 2015/0163088 A1 | 6/2015 | Anschutz |
| 2016/0134650 A1 | 5/2016 | Farmer et al. |
| 2017/0070482 A1 * | 3/2017 | Mandyam ........... H04L 63/0428 |
| 2017/0094597 A1 * | 3/2017 | Su ......................... H04W 76/25 |
| 2018/0020350 A1 * | 1/2018 | Vissa ................. G06K 9/00006 |

\* cited by examiner

NON-COMPLIANCE EVENT NOTIFICATIONS TO COMPANION DEVICES

BACKGROUND

Security is a big challenge in Information Technology (IT) nowadays due to a myriad of attack sources that exist. The challenge is compounded by the extensive number of connected or networked devices in a home or an enterprise network. When a device is compromised or breached due to an attack, a system administrator has to remedy the issue quickly before the other connected devices are also affected.

BRIEF DESCRIPTION OF THE DRAWINGS

Some examples of the present application are described with respect to the following figures.

DETAILED DESCRIPTION

Some software applications, such as an anti-virus application, may be installed in a device to monitor/detect irregular activities in the device that may indicate an attack. If any irregular activity is detected, a warning message may be displayed so that a system administrator may remedy the issue. However, the system administrator may not be in front of the device when the warning message is displayed. By the time the system administrator sees or becomes aware of the warning message, the device may become compromised already.

Examples described herein provide an approach to transmit a notification of a non-compliance event from a computing device to a companion device. For example, a computing device may include a processor to: establish a secure connection with a companion device via a companion service application executable by the processor; receive a local credential and a remote credential from the companion device via the companion service application; monitor an aspect of the computing device via, an agent application executable by the processor; and in response to detecting a non-compliance event via the agent application, transmit a notification to the companion device via the agent application using the local credential, the remote credential, or a combination thereof.

In another example, a non-transitory computer-readable storage medium may include instructions that when executed cause a processor of a computing device to: establish a secure connection with a companion device via a companion service application of the computing device; receive a local credential and a remote credential from the companion device via the companion service application: store the local credential and the remote credential in a storage location allocated to a firmware of the computing device; monitor an aspect of the computing device via an agent application executable by the processor; and in response to detecting a non-compliance event via the agent application, transmit a notification to the companion device via the agent application using the local credential, the remote credential, or a combination thereof.

In another example, a non-transitory computer-readable storage medium may include instructions that when executed cause a processor of a companion device to: establish a secure connection with a computing device via a companion service application of the companion device; transmit a local credential and a remote credential to the computing device via the companion service application; and receive a notification of a non-compliance event associated with the computing device via the local credential, the remote credential, or a combination thereof based on a communication range of the companion device, Thus, examples described herein may enable unattended management of a non-compliance event detected at a computing device.

Figure 1:
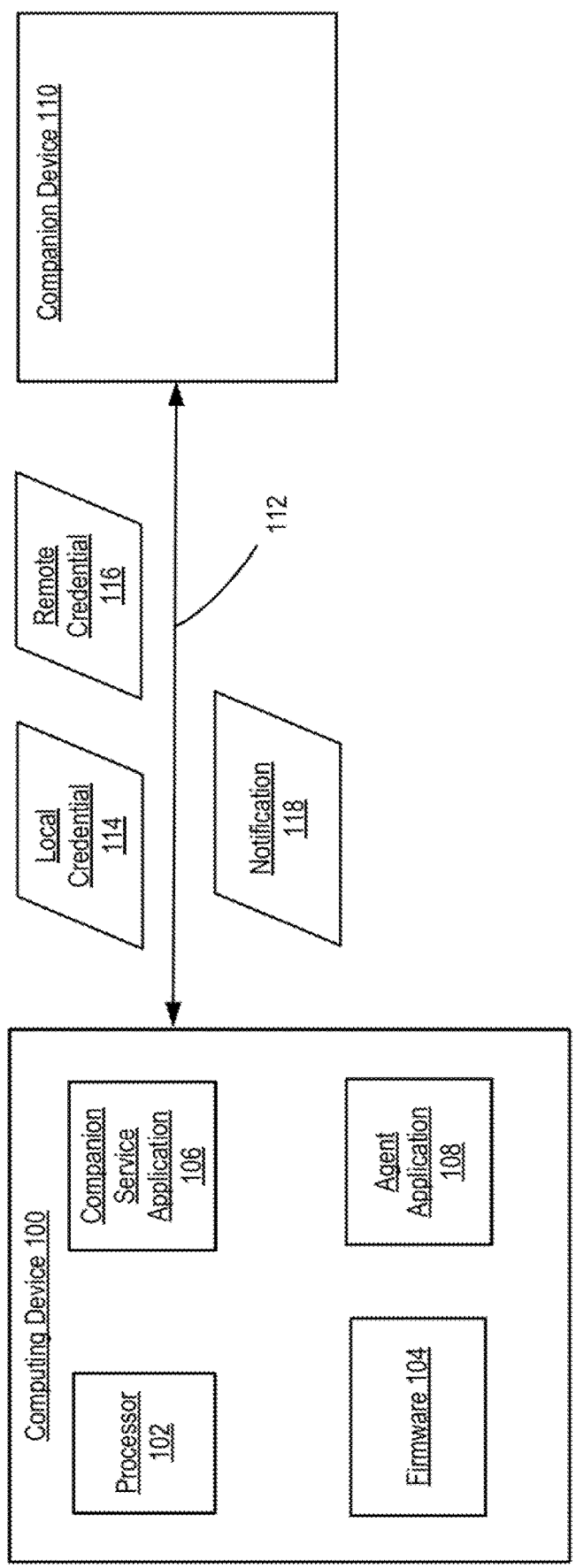
FIG. 1 illustrates a computing device to transmit a notification to a companion device using a local credential, a remote credential, or a combination hereof, according to an example.

FIG. 1 illustrates a computing device 100 to transmit a notification to a companion device using a local credential, a remote credential, or a combination hereof, according to an example. Computing device 100 may be, for example, a web-based server, a local area network server, a cloud-based server, a notebook computer, a desktop computer, an all-in-one system, a tablet computing device, a mobile phone, an electronic book reader, etc.

Computing device 100 may include a processor 102, a firmware 104, a companion service application 106, and an agent application 108. Processor 102 may control operations of computing device 100. Firmware 104 may perform hardware initialization and/or configuration of components (such as processor 102) of computing device 100. Firmware 104 may also provide runtime services for operation system(s) and application(s) executing at computing device 100. In some e examples, firmware 104 may be implemented as a Unified Extensible Firmware interface (UEFI). In some examples, firmware 104 may be implemented as a Basic Input/Output System (BIOS). Companion service application 106 and agent application 108 may be implemented using instructions executable by processor 102.

Companion service application 106 may establish a secure connection 112 between computing device 100 and a companion device 110 to exchange encrypted communications. Companion device 110 may be a computing device similar to computing device 100 or any other electronic device suitable to receive electronic messages. Companion service application 106 may be an interface or portal to communicate with companion device 110 via secure connection 112.

In some examples, secure connection 112 may be a pairing between computing device 100 and companion device 110 using the Bluetooth protocol. In some examples, secure connection 112 may be a wireless connection between computing device 100 and companion device 110 using the Institute of Electricals and Electronics Engineers (IEEE) 802.11 protocol. As part of the connection establishing process, a pair of encryption keys (not shown in FIG. 1) may be exchanged so that communications may be encrypted.

Agent application 108 may monitor an aspect of computing device 100. Agent application 108 may use a manifest file (not shown in FIG. 1) to determine what aspect(s) of computing device 100 to monitor. For example, a monitored aspect may include a value of a registry setting. In another example, the monitored aspect may include the execution of a particular application. When agent application 108 is executing, agent application 108 may add the execution of companion service application 106 to the manifest file as a monitored aspect of computing device 100.

During operation, when secure connection 112 is established, companion device 110 may transmit a local credential 114 and a remote credential 116 to computing device 100 via secure connection 112. Computing device 100 may receive credentials 114 and 116 via companion service application 106.

When companion service application receives credentials 114 and 116, companion service application 106 may transmit credentials 114 and 116 to agent application 108. Agent application 108 may encrypt credentials 114 and 116 and transmit encrypted credentials 114 and 116 to firmware 104 for storage.

When agent application 108 detects a non-compliance event, that is, the monitored aspect has deviated from the expected value or setting in the manifest file, agent application 108 may request encrypted credentials 114 and 116 from firmware 104. When agent application 108 receives encrypted credentials 114 and 116 from firmware 104, agent application 108 may decrypt credentials 114 and 116.

Agent application 108 may determine whether computing device 100 is within a communication range of companion device 110 via secure connection 112. For example, agent application 108 may request companion service application 106 to determine whether companion device 110 is reachable via secure connection 112. In response to a determination that companion device 110 is within the communication range, agent application 108 may transmit a notification 118 to companion device 110 using decrypted local credential 114.

In some examples, local credential 114 may be a public encryption key. Thus, agent application may encrypt notification 118 using the public encryption key and transmit encrypted notification 118 to companion service application 106. Companion service application 106 may relay encrypted notification 118 to companion device 110 via secure connection 112.

In some examples, local credential 114 may include a public encryption key and access information of companion device 110 (e.g., a user name and/or a password). Thus, agent application 108 may use the access information to prove to companion service application 106 that agent application 108 is authorized to communicate with companion device 110. Agent application 108 may then encrypt notification 118 using the public encryption key and transmit encrypted notification 118 to companion device 110 via companion service application 106.

In response to a determination that companion device 110 is outside the communication range, agent application 108 may transmit notification 118 to companion device 110 using a combination of decrypted local credential 114 and decrypted remote credential 116. Remote credential 116 may be access information (e.g., a user name and/or a password, a registration identification) of a server-based communication protocol, such as push notification or other cloud-based communication service.

Thus, agent application 108 may encrypt notification 118 using decrypted local credential 114. Agent application 108 may access a server (not shown in FIG. 1) using decrypted remote credential 116 to transmit encrypted notification 118 to companion device 110 via the server. In some examples, agent application 108 may access a server and identify companion device 110 using decrypted remote credential 116 so that the server may transmit encrypted notification 118 to companion device 110. In some examples, after notification 118 is sent, agent application 108 may erase decrypted local credential 114, decrypted remote credential 116, or a combination thereof for enhanced security. When companion device 110 receives notification 118, companion device 110 may respond to notification 118 based on the content of notification 118. The content of notification 118 is described in more detail in FIG. 2.

Figure 2:
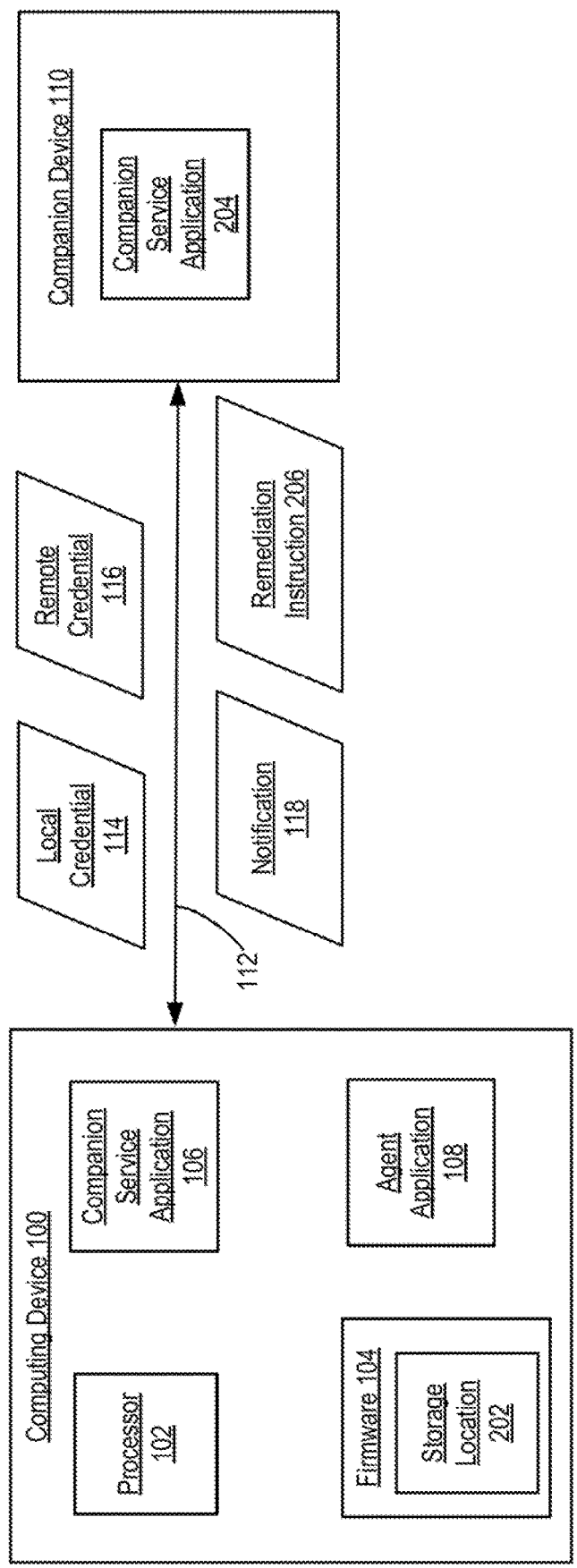
FIG. 2 illustrates a computing device to transmit a notification to a companion device using a local credential, a remote credential, or a combination hereof, according to another example.

FIG. 2 illustrates computing device 100 to transmit a notification to a companion device using a local credential, a remote credential, or a combination hereof, according to another example. In some examples, computing device may also include a storage location 202. Storage location 202 may be a storage device or particular storage address range (s) allocated to firmware 104. That is, storage location 202 may be accessible only by firmware 104. When firmware 104 receives encrypted credentials 114 and 116, firmware 104 may store encrypted credentials 114 and 116 in storage location 202.

Companion device 110 may include a companion service application 204 that performs similar function as companion service application 106 of computing device 100. Thus, companion service application 204 may establish secure connection 112 from the perspective of companion device 110. For example, companion service application 106 and companion service application 204 engage in a two-way communication to establish a secure connection. 100281 In some examples, notification 118 may be informational (e.g., a warning, an alert, etc.). Thus, companion device 110 may not respond to notification 118. Agent application 108 may remediate the non-compliance event based on the manifest file.

In some examples, notification 118 may ask for a response from companion device 110. Thus, in response to receiving notification 118, companion device 110 may generate a remediation instruction 206 that indicates to agent application 108 how the non-complaint event is to be remediated/fixed. Companion service application 204 may transmit remediation instruction 206 to companion service application 106 via secure connection 112. Companion service application 106 may transmit remediation instruction 206 to agent application 108. When agent application 108 receives remediation instruction 206 within a timeout period, agent application 108 may remediate the non-compliance event based on remediation instruction 206. When agent application 108 fails to receive remediation instruction 206 within a timeout period (e.g., upon an expiration of a timer), agent application 108 may remediate the non-compliance event based on the manifest file rather than remediation instruction 206.

In some examples, when computing device 100 is outside the communication range of companion device 110 and computing device 100 may not have Internet connectivity, agent application 108 may queue notification 118 until either companion device 110 is within the communication range or the Internet connectivity is available. Additionally, agent application 108 may send another notification (not shown in FIG. 2) to companion device 110 that notification 118 is associated with a non-compliance event that occurred in the past for audit and information purposes.

Figure 3:
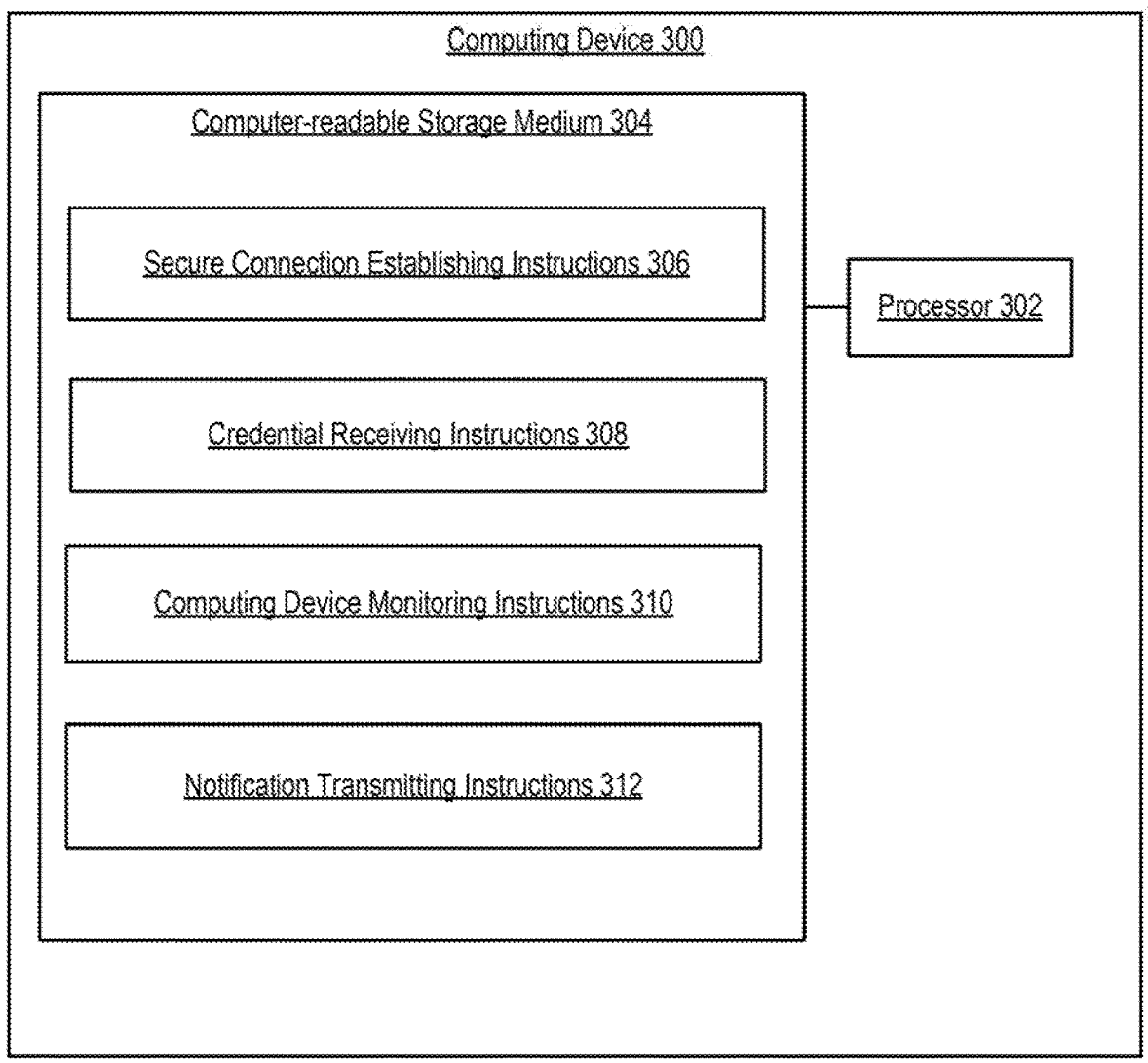
FIG. 3 illustrates a computing device to transmit a notification to a companion device using a local credential, a remote credential, or a combination hereof, according to another example.

FIG. 3 illustrates a computing device 300 to transmit a notification to a companion device using a local credential, a remote credential, or a combination hereof, according to another example. Computing device 300 may implement computing device 100 of FIGS. 1-2.

Computing device 300 may include a processor 302 and a computer-readable storage medium 304. Processor 302 may be a central processing unit (CPU), a semiconductor-based microprocessor, and/or other hardware devices suitable to control operations of computing device 300. Computer-readable storage medium 304 may be any electronic, magnetic, optical, or other physical storage device that contains or stores executable instructions. Thus, computer-readable storage medium 304 may be, for example, Random Access Memory (RAM), an Electrically Erasable Programmable Read-Only Memory (EEPROM), a storage device, an optical disc, etc. In some examples, computer-readable storage medium 304 may be a non-transitory storage medium, where the term "non-transitory" does not encompass transitory propagating signals. Computer-readable storage medium 304 may be encoded with a series of executable instructions 306, 308, 310, and 312.

Secure connection establishing instructions 306 may establish a secure connection between computing device 300 and a companion device, such as companion device 110 of FIGS. 1-2. For example, referring to FIG. 1, companion service application 106 may establish secure connection 112 between computing device 100 and companion device 110 to exchange encrypted communications.

Credential receiving instructions 308 may receive a credential from a companion device. For example, referring to FIG. 1, computing device 100 may receive credentials 114 and 116 via companion service application 106. Computing device monitoring instructions 310 may monitor an aspect of computing device 300 to ensure that aspect is compliant with a manifest file. For example, referring to FIG. 1, agent application 108 may monitor an aspect of computing device 100. Agent application 108 may use a manifest file to determine what aspect(s) of computing device 100 to monitor.

Notification transmitting instructions 312 may transmit a notification that indicates an occurrence of a non-compliance event from computing device 300 to the companion device. For example, referring to FIG. 1, agent application 108 may transmit a notification 118 to companion device 110 using local credential 114, remote credential 116, or a combination thereof.

Figure 4:
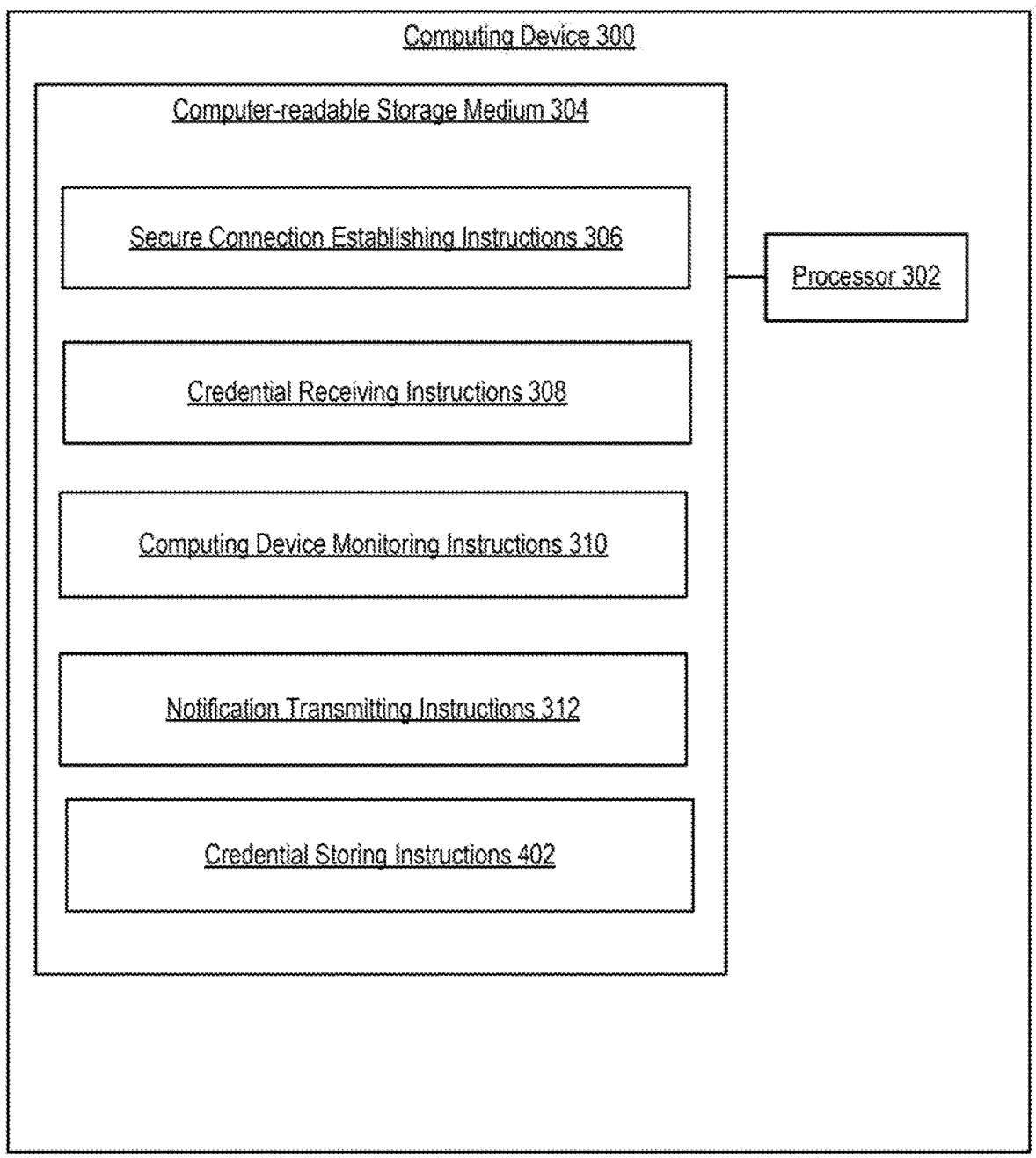
FIG. 4 illustrates a computing device to transmit a notification to a companion device using a local credential, a remote credential, or a combination hereof, according to another example.

FIG. 4 illustrates computing device 300 to transmit a notification to a companion device using a local credential, a remote credential, or a combination hereof, according to another example. In some examples, computer-readable storage medium 304 of computing device 300 may be further encoded with credential storing instructions 402. Credential storing instructions 402 may store a credential received from a companion device at a firmware (not shown in FIG. 4) of computing device 300. For example, referring to FIG. 2, when firmware 104 receives encrypted credentials 114 and 116, firmware 104 may store encrypted credentials 114 and 116 in storage location 202.

Figure 5:
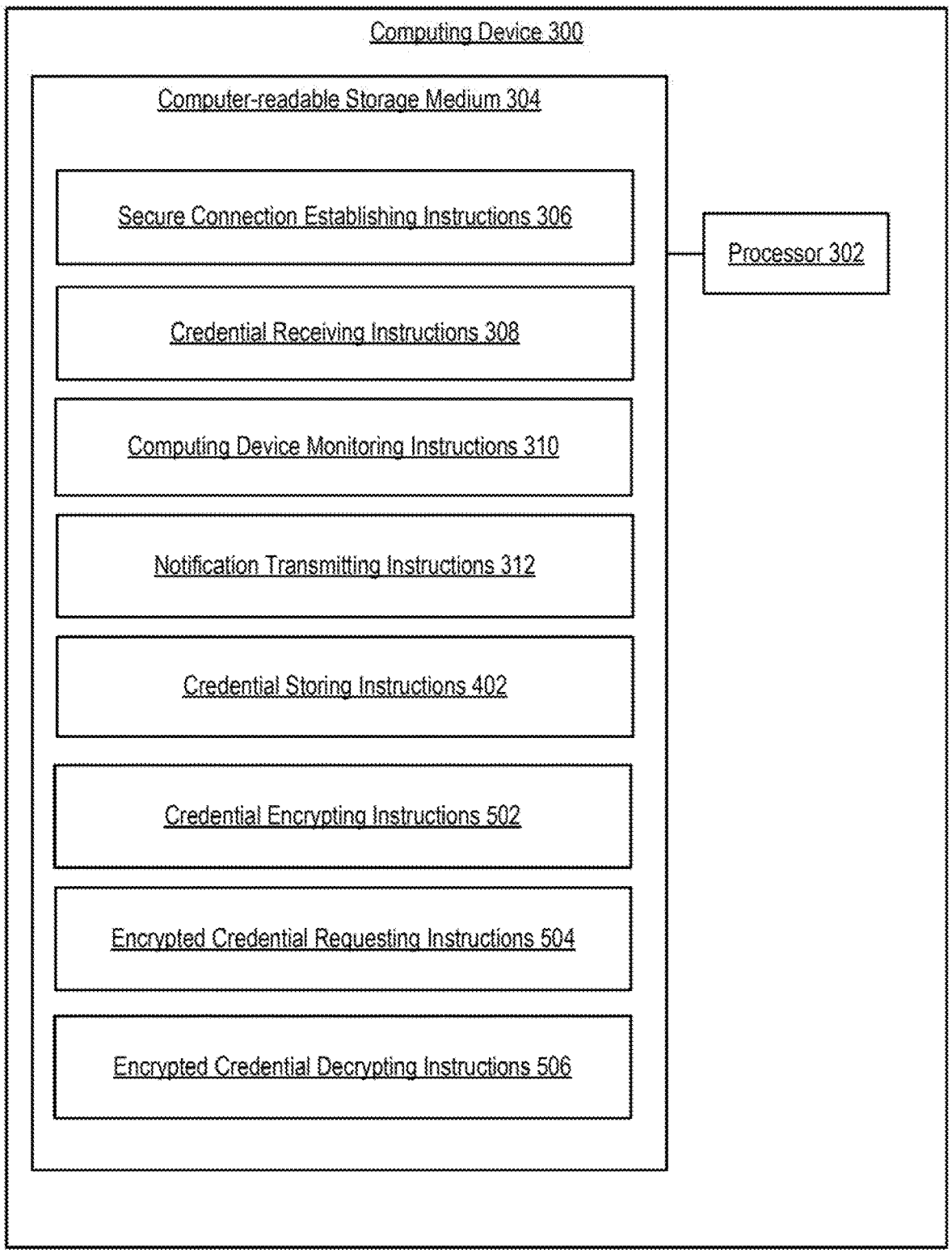
FIG. 5 illustrates a computing device to transmit a notification to a companion device using a local credential, a remote credential, or a combination hereof, according to another example.

FIG. 5 illustrates computing device 300 to transmit a notification to a companion device using a local credential, a remote credential, or a combination hereof, according to another example. In some examples, computer-readable storage medium 403 of computing device 300 may be encoded with instructions 306, 308, 310, 312, and 402. Computer-readable storage medium 403 may further be encoded with instructions 502, 504, and 506.

Credential encrypting instructions 502 may encrypt a credential before the credential is stored in a firmware of computing device 300. For example, referring to FIG. 1, agent application 108 may encrypt credentials 114 and 116 and transmit encrypted credentials 114 and 116 to firmware 104 for storage.

Encrypted credential requesting instructions 504 may request an encrypted credential from the firmware. For example, referring to FIG. 1, agent application 108 may request encrypted credentials 114 and 116 from firmware 104. Encrypted credential decrypting instructions 506 may decrypt an encrypted credential. For example, referring to FIG. 1, when agent application 108 receives encrypted credentials 114 and 116 from firmware 104, agent application 108 may decrypt credentials 114 and 116.

Figure 6:
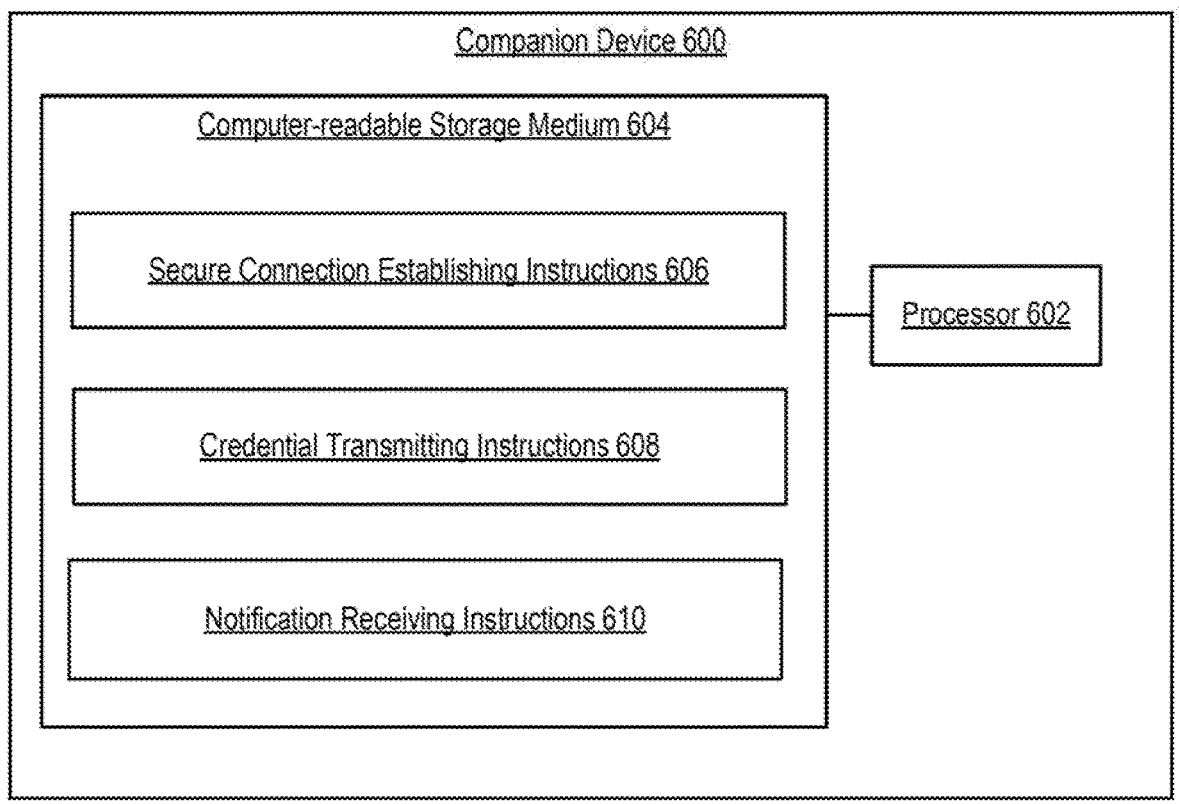
FIG. 6 illustrates a companion device to receive a notification from a computing device that is transmitted using a local credential, a remote credential, or a combination hereof, according to an example.

FIG. 6 illustrates a companion device 600 to receive a notification from a computing device that is transmitted using a local credential, a remote credential, or a combination hereof, according to an example. Companion device 600 may implement companion device 110 of FIGS. 1-2. Companion device 600 may include a processor 602 and a computer-readable storage medium 604. Processor 602 may be similar to processor 302 of FIGS. 3-5. Computer-readable storage medium 604 may be similar to computer-readable storage medium 304 of FIGS. 3-5. Computer-readable storage medium 604 may be encoded with instructions 606, 608, and 610 that are executable by processor 602.

Secure connection establishing instructions 606 may establish a secure connection with a computing device, such as computing device 100 of FIGS. 1-2 and computing device 300 of FIGS. 3-5. For example, referring to FIG. 2, companion service application 204 may establish secure connection 112 from the perspective of companion device 110. Credential transmitting instructions 608 may transmit a credential to a computing device. For example, referring to FIG. 1, companion device 110 may transmit a local credential 114 and a remote credential 116 to computing device 100 via secure connection 112. Notification receiving instructions 610 may receive a notification of a non-compliance event from a computing device. For example, referring to FIG. 1, when companion device 110 receives notification 118, companion device 110 may respond to notification 118 based on the content of notification 118.

The use of "comprising", "including" or "having" are synonymous and variations thereof herein are meant to be inclusive or open-ended and do not exclude additional unrecited elements or method steps.

What is claimed is:

1. A computing device comprising:
   a processor to:
   establish a secure connection with a companion device via a companion service application executable by the processor;
   receive and encrypt a local credential and a remote credential from the companion device via the companion service application;
   monitor an aspect of the computing device via an agent application executable by the processor; and
   in response to detecting a non-compliance event via the agent application:
   when the companion device is within a communication range of the computing device, decrypt the encrypted local credential and transmit a notification to the companion device via the agent application using the decrypted local credential, and when the companion device is outside the communication range of the computing device, decrypt the encrypted local credential and the encrypted remote credential and transmit the notification utilizing the decrypted local credential and the decrypted remote credential.

2. The computing device of claim 1, wherein the processor is to encrypt the the notification to the companion device using the decrypted local credential prior to transmission.

3. The computing device of claim 2, wherein the remote credential identifies the companion device to a server to be utilized as an intermediary to deliver the notification to the companion device.

4. The computing device of claim 2, wherein the remote credential includes access information of a server-based communication protocol.

5. The computing device of claim 1, wherein the local credential includes a public encryption key.

6. The computing device of claim 5, wherein the local credential further includes access information of the companion device.

7. The computing device of claim 1, wherein the secure connection is a wireless connection.

8. A non-transitory computer readable storage medium comprising instructions that when executed cause a processor of a computing device to:
  establish a secure connection with a companion device via a companion service application of the computing device;
  receive a local credential and a remote credential from the companion device via the companion service application;
  encrypt the local credential and the remote credential via an agent application;
  store the encrypted local credential and the encrypted remote credential in a storage location allocated to a firmware of the computing device;
  monitor an aspect of the computing device via the agent application executable by the processor; and
  in response to detecting a non-compliance event via the agent application:
    when the companion device is within a communication range:
      decrypt the encrypted local credential; and
      transmit a notification using the decrypted local credential; and
    when the companion device is outside the communication range:
      decrypt the encrypted local credential and the encrypted remote credential; and
      transmit the notification to the companion device via the agent application using the decrypted local credential and the decrypted remote credential.

9. The non-transitory computer-readable storage medium of claim 8, wherein the instructions when executed further cause the processor to:
  transmit the encrypted local credential and the encrypted remote credential from the agent application to the firmware for storage.

10. The non-transitory computer-readable storage medium of claim 9, wherein the instructions when executed further cause the processor to:
  in response to detecting the non-compliance event, request the encrypted local credential and the encrypted remote credential from the firmware;
  determine whether the companion device is within a communication range of the companion device via the secure connection.

11. The non-transitory computer-readable storage medium of claim 10, wherein the instructions when executed further cause the processor to erase the decrypted local credential, the decrypted remote credential, or a combination thereof.

12. The non-transitory computer-readable storage medium of claim 8, wherein the local credential includes a public encryption key.

13. The non-transitory computer-readable storage medium of claim 8, wherein the instructions when executed further cause the processor to monitor whether the companion service application is executing on the computing device via the agent application.

14. A non-transitory computer readable storage medium comprising instructions that when executed cause a processor to:
  establish a secure connection between a computing device and a companion device via a companion service application of the companion device;
  transmit a local credential and a remote credential from the companion device to the computing device via the companion service application;
  encrypt the local credential and the remote credential at the computing device;
  when the companion device is within a communication range:
    decrypt the encrypted local credential; and
    transmit a notification, of a non-compliance event associated with the computing device from the computing device to the companion device using the decrypted local credential; and
  when the companion device is outside the communication range:
    decrypt the encrypted local credential and the encrypted remote credential; and
    transmit the notification using the decrypted local credential and the decrypted remote credential.

15. The non-transitory computer-readable storage medium of claim 14, wherein the instructions when executed further cause the processor to receive, at the computing device, a remediation instruction sent from the companion device.

* * * * *